Dec. 1, 1942.  W. F. HINDERER  2,303,459
SURFACE GRINDING FIXTURE
Filed Aug. 2, 1941  3 Sheets-Sheet 1

Inventor
WALTER F. HINDERER
By Clarence A. O'Brien
Attorney

Dec. 1, 1942.  W. F. HINDERER  2,303,459
SURFACE GRINDING FIXTURE
Filed Aug. 2, 1941  3 Sheets-Sheet 2
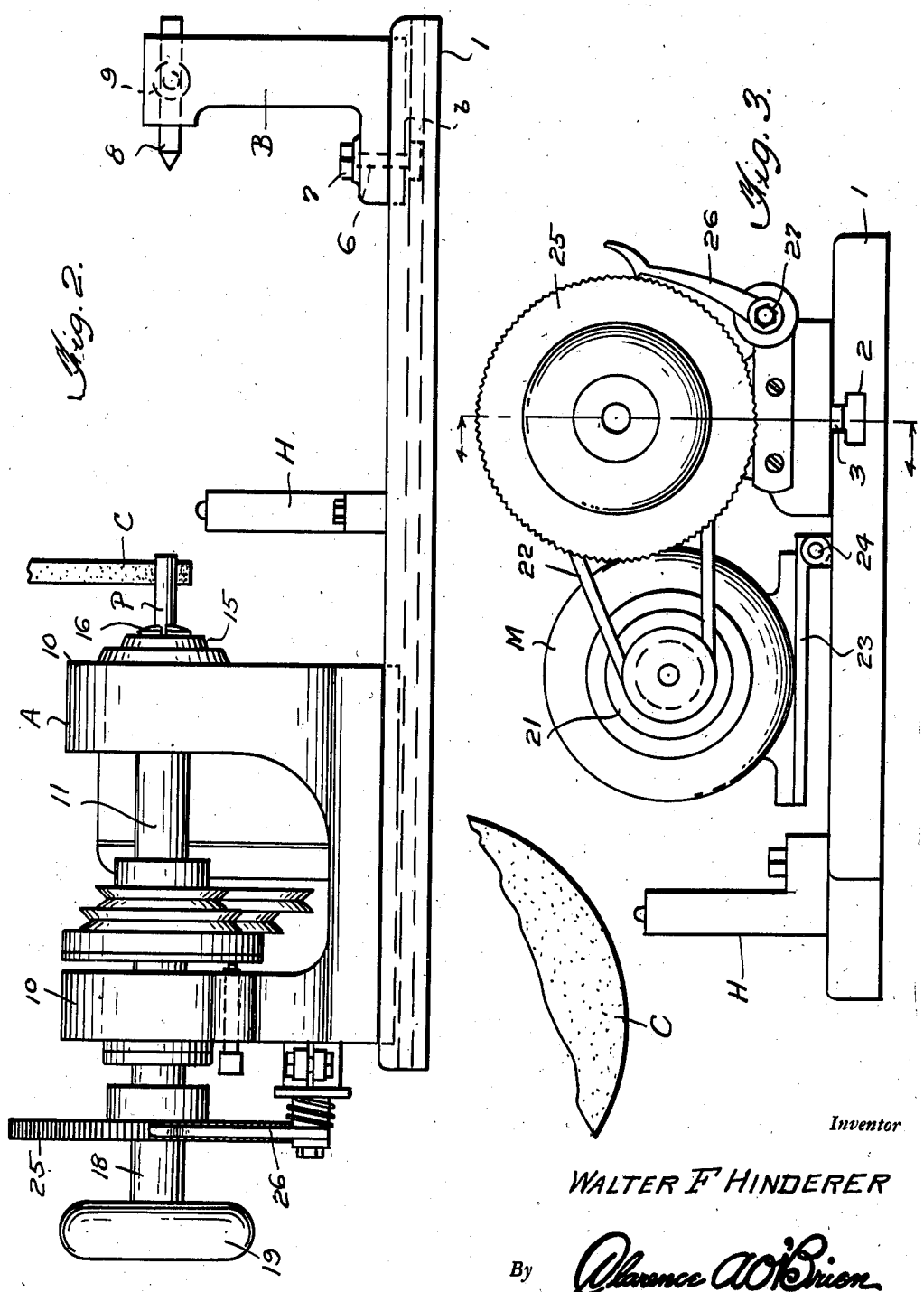
Inventor
WALTER F HINDERER
By  Clarence A O'Brien
Attorney

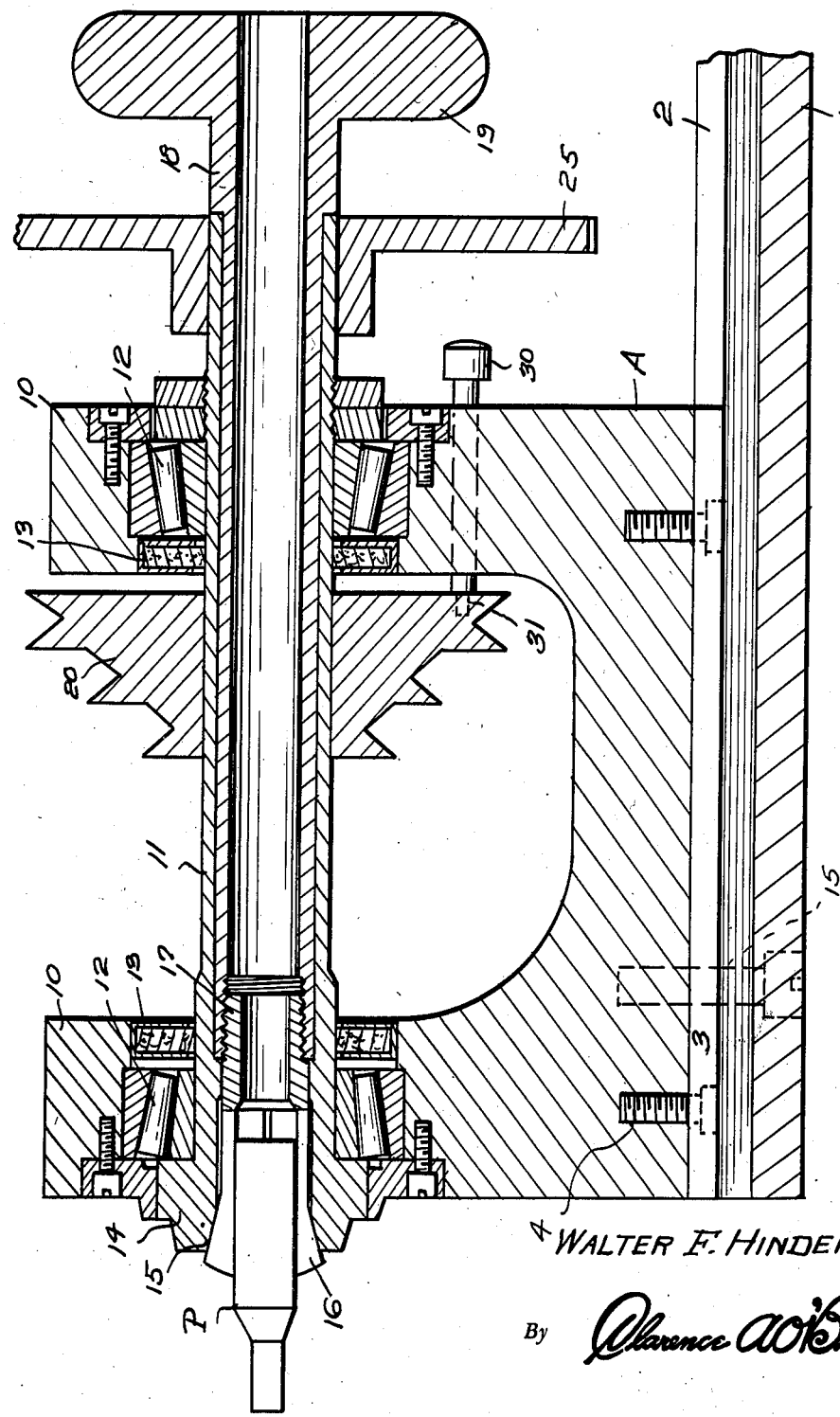

Patented Dec. 1, 1942

2,303,459

UNITED STATES PATENT OFFICE 2,303,459

SURFACE GRINDING FIXTURE

Walter F. Hinderer, Kankakee, Ill.

Application August 2, 1941, Serial No. 405,259

1 Claim. (Cl. 51—241)

This invention relates to a fixture used with a surface grinder, the general object of the invention being to provide means whereby various types of articles, such as punches, can be ground into various shapes and sizes without removing the object from the holding means.

This invention also consists in certain features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 2 is a side elevational view thereof.

Figure 3 is an end view looking toward the left hand end of Figure 2.

Figure 4 is a section on the line 4—4 of Figure 3.

Figure 1:
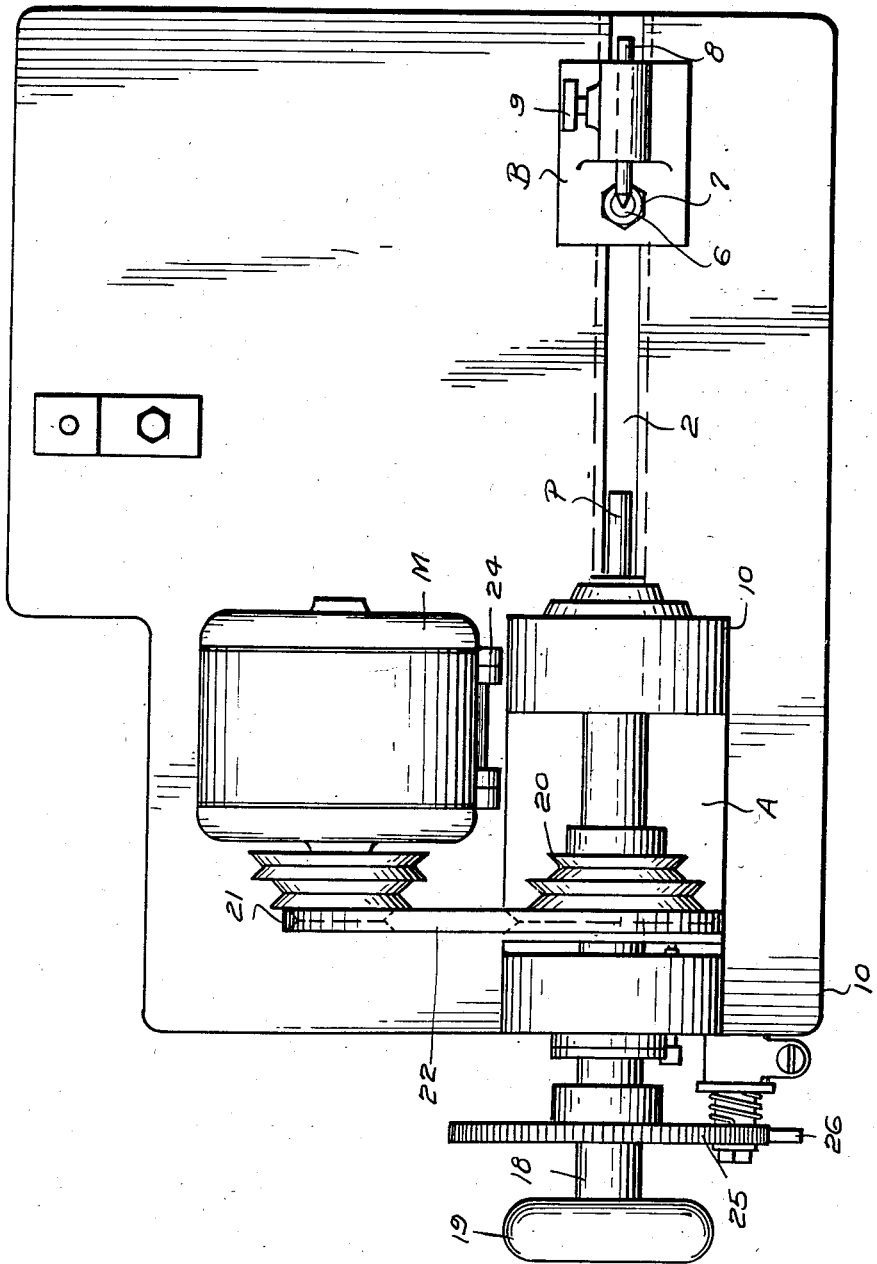
Figure 1 is a top plan view of the invention.

In these views the numeral 1 indicates the base plate of the machine which can be placed on any suitable form of supporting surface, such as a magnetic chuck usually used on the slide or table of a surface grinder. This base plate is formed with a straight slot or groove 2 in its upper surface which extends from one end of the plate to the other end thereof and the slot or groove has undercut side walls as shown in Figure 3. A lathe head A has a longitudinally extending rib 3 fastened by bolts 4 to the under face of the base thereof and bolts 5 fasten the head to the base plate 1 so that the lathe head is fastened in a stationary manner to the base plate 1. As shown the lathe head is located at the front end of the base plate so that it has its rib 3 occupying but a portion of the groove 2. A tail stock B has a rib b slidably arranged in the groove and a headed bolt 6 has its head sliding in the undercut part of the groove with the bolt pass through the rib into the base of the tail stock with the upper end of the bolt receiving a nut 7 so that by loosening the nut the tail stock can be moved toward or away from the lathe head after which the nut is tightened to hold the tail stock in adjusted position.

By providing the groove 2 extending from one end of the base plate to the other the tail stock is held in alignment with the lathe head in all adjustments of the tail stock. The tail stock carries the usual pointed or female shank 8 which is held in adjusted position by the lock screw 9.

The lathe head includes the two upright parts 10 through which the tubular spindle 11 passes, anti-friction bearings 12 being provided for the spindle and packing means 13 are also provided for the spindle in the uprights to retain lubricant within the chambers occupied by the anti-friction means. The inner end of the spindle is enlarged as shown at 14 and the bore formed by the tubular spindle has a flaring end 15 in this enlarged part for receiving the tapered part of the collets 16. A tubular part 17 has its inner end exteriorly threaded and the collets are, of course, formed on this part. The draw-in spindle is shown at 18 and has its major part reduced to slide into the spindle with its inner end threaded to engage the threaded part of the member 17 so that by rotating the draw-in spindle by its knob 19 the collets can be moved outwardly or inwardly in the usual manner.

A multiple pulley 20 is fastened to the spindle 11 and is located between the uprights 10 and a motor M is also provided with a multiple pulley 21 for driving the belt 22 which passes over a section of the pulley 20 so that the spindle 11 can be driven at different speeds. While the drawings show this pulley and belt drive means it is to be understood that the spindle can be driven from the motor by gears or in any other suitable manner. The base 23 of the motor is hinged at that edge closest to the lathe head to a part of the base plate, as shown at 24 so that the weight of the motor will keep the belt tight.

An index plate 25 is connected with the spindle 11 and the index pawl 26 is pivoted to the base part of the lathe head as shown at 27 this pawl engaging the toothed circumference of the plate to hold the plate in adjusted position, these parts being of the usual or any desired construction and act to hold the spindle in adjusted position after it has been manually turned and is not being turned by the motor.

The grinding wheel of the surface grinder is shown at C and it is of course understood that the surface grinder can be adjusted to bring the wheel against the work piece, such as a punch P, held by the collets. The diamond dresser holder is shown at H and is carried by the base plate and is adapted to be adjusted to a position where it will dress the wheel C.

A pin 30 is slidably carried by the outer upright 10 and when pushed in will engage a socket 31 in the pulley 20 to hold the pulley against movement.

The work piece or punch is made longer than usual and the extra length is held by the collets so that the entire effective length of the punch can be operated upon by the grinding wheel. The free end of the punch can be held by the shank of the tail stock. When the shank of the punch is to be ground cylindrical the grinding wheel is placed against the shank and then the motor started up to rotate the spindle and the punch and thus the shank will be ground into a cylindrical shape and if the rest of the punch is to be ground into cylindrical shape the cutting wheel is adjusted to engage the outer part of the punch to give it this reduced cylindrical shape while the spindle is being driven by the motor. If the punch is to be given a non-circular shape then the belt is removed from the pulley 20 and the spindle 11 adjusted and then held in adjusted position by the index plate 25 and the pawl 26. Then the grinding wheel is placed against the punch to form a flat side thereon. Then the parts are again adjusted to bring another part of the punch into grinding position and another flat side ground on this part of the punch and in this way the work piece can be made of square shape in cross section, of octagon shape, etc.

With this invention it is possible to grind punches with a reduced portion concentric with the shank of the punch or the shank concentric with the rest of the punch and by using the index plate and pawl it is possible to turn the punches over from edge to edge. The various sizes are obtained by the movable column on the surface grinder where the grinding wheel spindle and wheels are attached with the parts traveling in a vertical direction. The sizes are obtained by going down to the same figures on the column. The length of the punches desired is obtained by the table of the surface grinder moving forward and back into the position desired.

With this invention piercing punches of various shapes and sizes can be ground absolutely concentric with the shank inasmuch as the punch proper is ground at the same setting that the shank is ground and round shank punches can be made with square, oblong or any other shape punches desired.

The invention can also be used for sharpening milling cutters on their faces as well as side teeth of the cutters and for grinding teeth and side clearance on saws and the like.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a surface grinding machine, a base plate, a lathe head slidably mounted thereon, a spindle, said head including a pair of spaced apart upright bearing supports, bearing assemblies in the supports rotatably supporting the spindle at each end, a head on one end of the spindle retaining one bearing assembly in position in its support, a nut threaded on the spindle retaining the other bearing assembly in position in its support, a flared bore in the head, a collet having a flared outer end positioned in the flared bore of the head, a draw-in spindle journaled in the first-named spindle and having one end threadedly engaged with the collet, a handle on the other end of the draw-in spindle, said draw-in spindle having an external shoulder adjacent the handle forming an abutment for the adjacent end of the first-named spindle, an index plate secured on the first-named spindle, a pawl pivoted to the lathe head and engaging the index plate for holding its attached spindle in adjusted position, a drive pulley on the first-named spindle between the supports, a motor operatively connected to the pulley for rotating the first-named spindle, and a pin carried by one of the supports and releasably engaging the pulley for holding the first-named spindle stationary while the collet is being moved to releasing position.

WALTER F. HINDERER.